United States Patent Office 2,833,140
Patented May 6, 1958

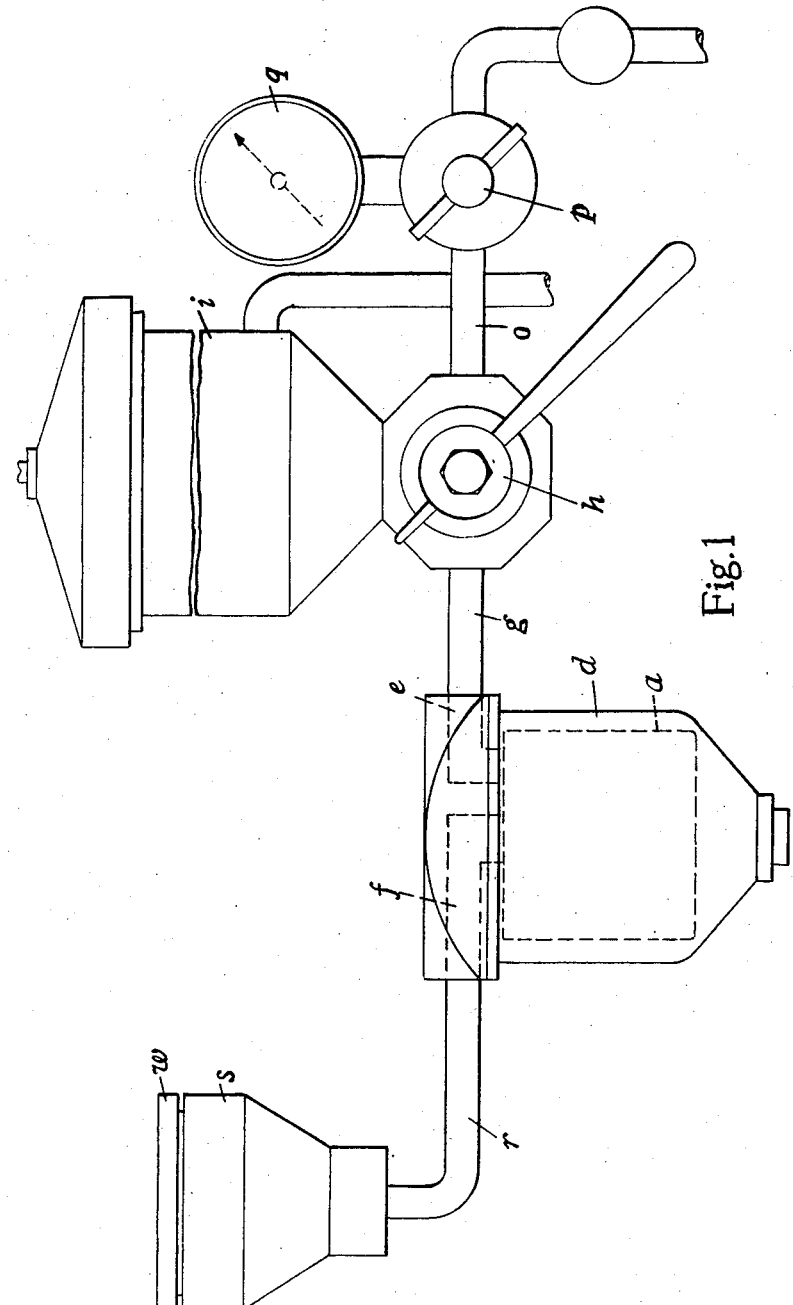

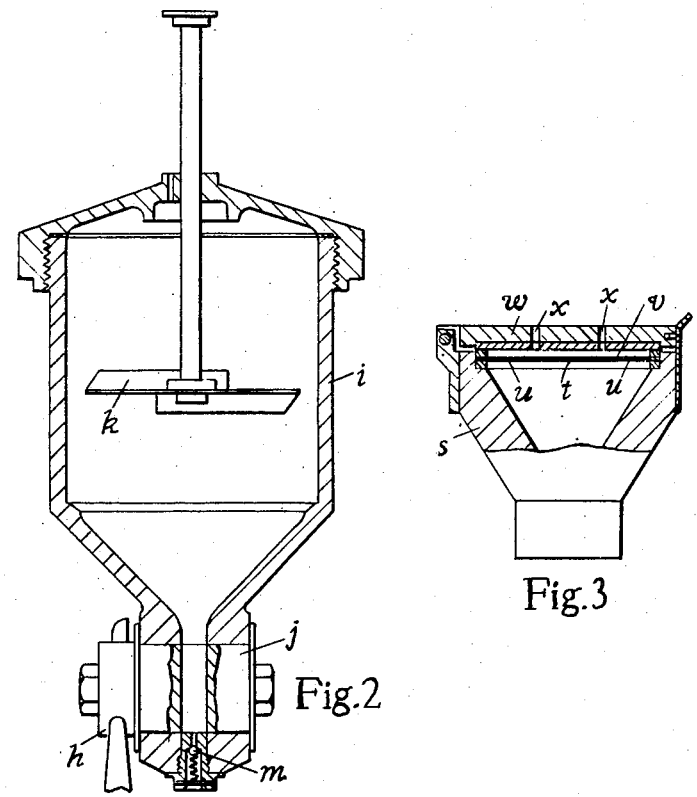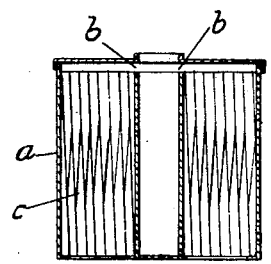

2,833,140

MEANS FOR TESTING PAPER OR OTHER FILTERS

Alan Ewart Walter Austen, Sunbury-on-Thames, and David Basil Wedmore, Ealing, London, England, assignors to C. A. V. Limited, London, England Application September 1, 1955, Serial No. 531,929

Claims priority, application Great Britain September 22, 1954

3 Claims. (Cl. 73—38)

The invention has for its object to provide a simple means for detecting the presence in a paper or other filter, of defects in the form of punctures of larger size than the normal foramina of the filter by blowing through the latter a quantity of air laden with dust of such size as would be intercepted by a non-defective filter.

The invention comprises the combination with a chamber for accommodating a filter to be tested, which chamber is provided with an air inlet, and with an outlet whereby air admitted to the chamber through the inlet can leave the chamber after having passed through the filter to be tested, of a first conduit connected to the chamber inlet for conducting thereto a stream of air under pressure, means for introducing into the first conduit a quantity of dust which can be carried by the air stream into the chamber, a second conduit connected to the chamber outlet for receiving the air from the chamber, and a device connected to the second conduit for detecting the presence of dust in the effluent air, the said device having baffle means for promoting the deposition of airborne dust, and an inspectable surface on which such deposition can take place.

In the accompanying drawings:

Figure 1 shows the general arrangement of an apparatus embodying the invention.

Figure 2 is a sectional side elevation of the dust hopper, and Figure 3 is a part sectional side elevation of the dust detecting means.

Figure 4 is a sectional side elevation of one form of filter required to be tested by the apparatus shown in Figure 1.

Referring to Figure 4, the filter there shown consists of a cylindrical shell $a$ which is open at its lower end, and has an outlet $b$ at its upper end. Within the shell is contained a spirally coiled filter paper strip $c$, such that air entering the lower part of the shell must pass through the walls bounding the coils of the strip before it can emerge through the outlet $b$.

In one example of means for testing the paper strip, there is provided a chamber $d$ (Figure 1) into which the filter can be inserted, the chamber having an inlet $e$ and oulet $f$ respectively situated at opposite sides of the chamber $d$. The inlet is connected by a pipe $g$ to a measuring tap $h$ situated at the lower end of a dust-storage hopper $i$. The tap includes an angularly movable plug $j$ (Figure 2) in which is formed a transverse hole of such capacity as will contain the required amount of dust for each test. In other words, the tap is adapted to dispense measured quantities of dust from the dust-storage hopper $d$, the movable plug serving as a measure for the quantities of dust dispensed.

In the hopper may be arranged a stirrer $k$, and in the lower part of the tap is provided a pressure relief valve $m$. Also the tap is connected by another pipe $o$ to any convenient source of compressed air. In the pipe $o$ is connected a pressure regulating tap $p$ and a pressure gauge $q$.

The outlet of the chamber $d$ is connected by a pipe $r$ to the lower end of an inverted conical collecting chamber $s$ which at its upper end is fitted with a baffle $t$ (Figure 3) having adjacent to its periphery a number of holes $u$, or an annular passage, through which air can flow from the chamber to a shallow compartment $v$ above the baffle. This compartment is closed by a hinged or removable lid $w$ which is provided with a ring of outlet holes $x$ situated at about mid-way between its centre and its periphery. Also if desired a lamp may be provided for brightly illuminating the lid when it is turned to its open position.

A convenient dust for use in carrying out a test is lycopodium, and the mode of making a test is as follows:

After the filter to be tested has been placed in its chamber, a quantity of dust is admitted to the tap $h$ from the hopper $i$. The tap is then moved to the position which allows the compressed air to blow the dust from the tap to the filter. If the filter is defective, the air on passing through the filter will carry with it some of the dust to the collecting chamber and thence to the above mentioned compartment $v$ above this chamber. Here the swirling air will deposit at least a part of the air-borne dust on the central part of the underside of the lid, and on inspection, the amount of dust so deposited will serve to give the required indication of the condition of the filter. After the filter has been tested, the adherent dust may be shaken off.

Whilst the invention is more particularly required for testing paper filters of various forms, it may also be used for testing filters made from woven or matted filamentary materials, or from porous ceramics or the like. Moreover, the invention is not restricted to the above described dust-detecting means, as subordinate details may be varied to suit different requirements.

Having thus described our invention what we claim as new and desire to secure by Letters Patent is:

1. Apparatus for testing paper or other filters by blowing therethrough air laden with dust of such size as would be intercepted by a non-defective filter, comprising the combination with a chamber for accommodating a filter to be tested, which chamber is provided with an air inlet, and with an outlet whereby air admitted to the chamber through the inlet can leave the chamber after having passed through the filter to be tested, of a first conduit connected to the chamber inlet for conducting thereto a stream of air under pressure, means for introducing into the first conduit a quantity of dust which can be carried by the air stream into the chamber, a second conduit connected to the chamber outlet for receiving the air from the chamber, and a device connected to the second conduit for detecting the presence of dust in the effluent air, the said device having baffle means for promoting the deposition of air-borne dust, and an inspectable surface on which such deposition can take place.

2. Apparatus according to claim 1, in which the dust-detecting device comprises in combination a collecting chamber connected at its lower end to the second conduit, a cover mounted on the upper end of the collecting chamber and having air outlets therein, and a baffle arranged in the upper end of the collecting chamber to deflect along the underside of the cover air flowing to the outlets in the cover, and thereby promote the deposition of air-borne dust on the underside of the cover, the latter being movable to enable its underside to be inspected.

3. Apparatus according to claim 1, in which the means for introducing the dust into the first conduit comprise a dust-storage hopper, and a measuring tap situated at the lower end of the hopper and having a part movable between dust-receiving and dust-dispensing positions for enabling measured quantities of dust to be transferred from the hopper to the first conduit.

References Cited in the file of this patent

UNITED STATES PATENTS

| | | |
|---|---|---|
| 2,187,514 | Gardner | Jan. 16, 1940 |
| 2,638,688 | Hazelton | May 19, 1953 |

OTHER REFERENCES

Dill: "A test method for air filters" American Society of Heating and Ventilation Engineers 1938, pages 379–384. (Copy in Scientific Library.)